United States Patent
Schwaiger et al.

(10) Patent No.: US 10,829,613 B2
(45) Date of Patent: Nov. 10, 2020

(54) CARBON BLACK COMPOSITIONS

(71) Applicant: Orion Engineered Carbons GmbH, Frankfurt (DE)

(72) Inventors: Bernhard Schwaiger, Erftstadt (DE); Werner Niedermeier, Brühl (DE); Thomas Pelster, Brühl (DE); Arndt-Peter Schinkel, Marienhausen (DE); Silke Teike, Elsdorf (DE); Conny Vogler, Ruppichteroth (DE)

(73) Assignee: Orion Engineered Carbons GmbH, Frankfurt (DE)

( * ) Notice: Subject to any disclaimer, the term of this patent is extended or adjusted under 35 U.S.C. 154(b) by 129 days.

(21) Appl. No.: 16/121,137

(22) Filed: Sep. 4, 2018

(65) Prior Publication Data
US 2019/0062522 A1 Feb. 28, 2019

Related U.S. Application Data (62) Division of application No. 14/774,391, filed as application No. PCT/EP2014/055042 on Mar. 13, 2014, now abandoned.

(30) Foreign Application Priority Data

Mar. 15, 2013 (EP) .................................... 13159552

(51) Int. Cl.
*C08K 3/04* (2006.01)
*C09C 1/50* (2006.01)
(Continued)

(52) U.S. Cl.
CPC ................. *C08K 3/04* (2013.01); *B01J 19/24* (2013.01); *B01J 19/26* (2013.01); *B82Y 30/00* (2013.01);
(Continued)

(58) Field of Classification Search
CPC ... C08K 3/04; B01J 19/24; B01J 19/26; B01J 2219/00051; B01J 2219/24; B01J 2208/00681; B01J 2219/00123; B01J 2219/00157; C08L 7/00; B82Y 30/00; C09C 1/50; C01P 2004/54; C01P 2004/62; C01P 2004/64; C01P 2006/22; C01P 2004/52; C01P 2004/50; C01P 2006/12;
(Continued)

(56) References Cited

U.S. PATENT DOCUMENTS 5,254,325 A 10/1993 Yamasaki et al.
6,153,684 A 11/2000 Shieh et al.
(Continued)

FOREIGN PATENT DOCUMENTS

EP 546 008 B1 6/1995
FR 2 653 775 A1 5/1991

*Primary Examiner* — Richard M Rump
(74) *Attorney, Agent, or Firm* — Dilworth & Barrese, LLP (57) ABSTRACT

Suggested is a carbon black composition showing a narrow Aggregate Size Distribution (ASD) characterized by a $\Delta D_{50}/D_{mode}$ value of about 0.58 to about 0.65 and a Relative Span $(D_{90}-D_{10})/D_{50}$ of about 0.5 to about 0.8, which is obtainable by means of a modified furnace reactor. The composition shows superior additive performance and allows producing e.g. bus or truck tires with improved wear resistance and reinforcement.

16 Claims, 4 Drawing Sheets

Lateral cut of the furnace reactor according to the invention (51) Int. Cl.
*B01J 19/26* (2006.01)
*B82Y 30/00* (2011.01)
*C08L 7/00* (2006.01)
*B01J 19/24* (2006.01)

(52) U.S. Cl.
CPC .......... *C08L 7/00* (2013.01); *C09C 1/50* (2013.01); *B01J 2208/00681* (2013.01); *B01J 2219/00051* (2013.01); *B01J 2219/00123* (2013.01); *B01J 2219/00157* (2013.01); *B01J 2219/24* (2013.01); *C01P 2004/50* (2013.01); *C01P 2004/52* (2013.01); *C01P 2004/54* (2013.01); *C01P 2004/62* (2013.01); *C01P 2004/64* (2013.01); *C01P 2006/11* (2013.01); *C01P 2006/12* (2013.01); *C01P 2006/19* (2013.01); *C01P 2006/22* (2013.01); *C08K 2201/003* (2013.01)

(58) Field of Classification Search
CPC ... C01P 2006/11; C01P 2006/19; C01B 32/30
See application file for complete search history.

(56) References Cited

U.S. PATENT DOCUMENTS

| | | |
|---|---|---|
| 8,236,274 B2 | 8/2012 | Quitmann et al. |
| 2008/0219915 A1 | 9/2008 | Quitmann et al. |
| 2011/0236816 A1 | 9/2011 | Stanyschöfsky et al. |

Figure 1

Lateral cut of the furnace reactor according to the invention

Figure 2  Comparison of ASD according to Example 1 and Comparative Example C1

Figure 3

Comparison of ASD according to Example 2 and Comparative Example C2

Figure 4

Comparison of ASD according to Example 3 and Comparative Example C3

CARBON BLACK COMPOSITIONS

FIELD OF INVENTION

The present invention belongs to the area of carbon blacks and refers to compositions comprising them, showing a narrow aggregate size distribution and improved properties, which are obtainable by using a modified furnace reactor with improved geometry.

STATE OF THE ART

Carbon black is the state-of-the-art reinforcing material in rubber compositions. Its morphology, such as specific surface area and structure, affects various physical properties of end products, such as wear performance, rolling resistance, heat built-up, and tear resistance of tires. The wear performance is particularly important for bus and truck tires, where the tires have to deal with very heavy loads. In truck or bus tread compounds finely dispersed carbon black particles are necessary for achieving a very high level of wear performance. However, this is limited due to the fact that with increasing specific surface area of carbon black the dispersability becomes more difficult.

Carbon black consists of roughly spherical primary particles in the nanometres range that form larger aggregates, which are its smallest dispersible unit. The carbon black structure is determined by the shape and size of these aggregates. The Aggregate Size Distribution (ASD) is a fingerprint for each carbon black composition. It is a measure of the distribution of aggregate sizes in the composition, which has been recognized as one important factor in the reinforcing ability of rubber. If all other features of carbon black are kept constant, smaller aggregates contribute stronger to wear performance. Bigger aggregates can be dispersed easier, but do not contribute as good as small aggregates to the wear performance. It is well known, that especially a small proportion of bigger aggregates can significantly infringe wear performance.

In order to describe carbon black compositions and distinguish one composition from an-other, at least two values are of significant importance:

The ASD reflects the relative amount by mass at each size. It is most often unimodal (single peaked) but not monodisperse (all one size). The modal diameter $D_{mode}$ (also called "mode") is the most frequent diameter, which equals the peak position of the distribution. The distribution's width can be expressed by its full width at half maximum (FWHM), also called $\Delta D_{50}$. According to DIN ISO 15825 $\Delta D_{50}$ represents the width of the mass distribution measured at the half-maximum point of the mode. A relative fractional measure of width is obtained by dividing $\Delta D_{50}$ by the modal diameter $D_{mode}$ which is expressed by the $\Delta D_{50}/D_{mode}$ value.

While the $\Delta D_{50}/D_{mode}$ value is only a measure for the broadness of the peak of the distribution curve, it does reflect neither the amount of small nor of big aggregates. Therefore a second value is necessary.

If one integrates the ASD curve, the cumulative distribution is obtained. It reflects the relative amount by mass at or below a particular size. There are several measures of absolute width one can derive given the cumulative distribution. One common measure is the so-called span, $D_{90}$-$D_{10}$. A dimensionless measure of width is the so-called Relative Span (RS) which is defined by the quotient of span and median diameter $(D_{90}-D_{10})/D_{50}$ (see Weiner, "What is a Continuous Particle Size Distribution", Brookhaven Instruments, 2011). $D_{10}$, $D_{50}$ and $D_{90}$ represent the volume fractions determined from the cumulative curve at 10, 50 and 90% respectively. The narrower a distribution is the more closely the absolute measure of width $\Delta D_{50}$ and the RS approach zero.

The so-called Quartile Ratio (QR) $D_{75}/D_{25}$ is a third and optional parameter describing the mass relation of smaller to bigger particles. According to DIN ISO 15825 the QR value is defined as being the ratio of upper quartile to lower quartile of the area under the cumulative curve. In contrast to $\Delta D_{50}$ and RS, the narrower a distribution is the more closely this relative measure of width approaches unity.

Finally, the ratio of mass weighted average particle size $D_w$ and number weighted average particle size $D_n$ is a measure for homogeneity of overall particle sizes. This ratio $D_w/D_n$ is also called Polydispersity Index. While large values reflect inhomogeneous, small values are representative for homogeneous particle size distributions.

In view of the explanations given above, there is a serious need in the market for carbon black compositions with narrow particle distribution, in particular compositions showing (a) a $\Delta D_{50}/D_{mode}$ of from 0.58 to 0.65 and simultaneously
(b) a RS value of 0.5 to 0.8 and optionally also
(c) a QR value of from 1.2 to 1.5 and/or
(d) a $D_w/D_n$ value below 1.35.

From the state of the art various processes are known for obtaining carbon black compositions with conventional broad ASD, which mainly differ in the geometry of the furnace reactors that are used for cracking and or incomplete combustion of hydrocarbon feedstocks to produce carbon black.

For example EP 0546008 B1 (CABOT) refers to improved carbon black that is characterized by the following multitude of features: a CTAB value of greater than 155 m²/g, an iodine number of greater than 180 mg/g; an $N_2$ SA value of greater than 160 m²/g; a tint value of greater than 145%; a CDBP value of 90 to 105 cc/100 g; a DBP value of 155 to 140 cc/100 g; a ΔDBP=DBP−CDBP value of 20 to 35 cc/100 g; a ΔD50 value of less than 40 nm; a Dmode of 40 to 65 nm; a ΔD50/Dmode ratio of 0.55 to 0.67; and an ASTM aggregate volume of less than 1376.000 nm³. The carbon black is obtained using a modular, also referred to as "staged", furnace reactor. This reactor has different dimensions compared to the modified furnace reactor with improved geometry of the present invention.

The carbon black obtained from such reactor does not match with the complex profile which underlies the invention. In particular the specific surface area and the tint value are higher.

Also EP 0608892 B1 (BRIDGESTONE) discloses a specific furnace reactor for making carbon black. As shown in FIG. 2 the combustion chamber is connected with a venturi portion which opens conically to the reaction chamber. However, the dimensions of this reactor are different compared to the modified reactor of the present invention. Especially the choke area has a diameter to length ratio larger than 1. The carbon black compositions exhibit $\Delta D_{50}/D_{mode}$ values of 0.61 to 0.79. According to table 3 product A shows a ratio of 0.61 which lies within the preferred area, however from the $\Delta D_{10}/D_{mode}$ value and also FIG. 1 it is obvious that the composition contains a significant amount of particles with large size.

According to EP 0792920 A1 (MITSUBISHI) a carbon black showing a $\Delta D_{50}/D_{mode}$ ratio of only 0.47 to 0.53 is obtained using a furnace reactor with long choke (d/l=0.1 to 0.8), but without Venturi section. The process provides particles with very narrow ASD, much narrower figures for $\Delta D_{50}/D_{mode}$ than in the present invention.

A very similar teaching is obtained from EP 0982378 A1 (MITSUBISHI), disclosing carbon black with very narrow ASD, but with very small particle sizes of at most 13 nm, which is obtained from a reactor with a very long choke section. The process also requires specific oxygen concentrations at feedstock injection of at most 3 Vol.-%, preferably 0.05 to 1 Vol.-%.

International patent application WO 2013 015368 A1 (BRIDGESTONE) discloses a carbon black characterized by the standard deviation of the aggregate distribution of the carbon black obtained by a light scattering method. The furnace reactor is characterized by a cylindrical reaction zone and is unsuitable for producing a carbon black with homogenous particle size distribution.

French patent application FR 2653775 A1 (TOKAI CARBON) also relates to a method for producing a carbon black having a BET value of 125 to 162 m2/g and a $\Delta D_{st}/D_{st}$ ratio of 0.55 to 0.66. The corresponding reactor has a different geometry compared to the modified furnace reactor of the present invention. In particular one part of the fuel is injected into a primary pre-combustion zone, while another part is injected into the secondary pre-combustion zone axially or radially. The products thus obtained do not fulfil the complex profile explained above.

U.S. Pat. No. 5,254,325 (NIPPON STEEL) discloses a reactor for producing carbon black with a throat for maintaining the hot gas in a piston flow state. The carbon black feedstock is introduced at different positions, mainly behind the throat into the Venturi section. The carbon black thus obtained is far away to show a narrow ASD, as also obvious from the shown examples. The corresponding $\Delta D_{50}/D_{st}$ ratios range from 0.73 to 1.20.

Japanese patent application JP 2001 240 768 A1 (MITSUBISHI) refers to a carbon black obtained from a furnace reactor with a very long choke area of at least 500 mm for use in paints having an average particle diameter of 16 nm or less, that is after-treated with nitric acid. The products encompass a high volatile fraction and are difficult to incorporate in a rubber composition.

So far the processes known from the state of the art are not suitable to provide carbon black compositions that fulfil the increasing needs of the polymer, in particular the rubber and tire industry. In particular, the reactors and process are unsuitable for producing carbon blacks with homogenous particle size distribution. It has therefore been the object of the present invention, to make a narrow carbon black composition available showing simultaneously $\Delta D_{50}/D_{mode}$ ratios of from 0.58 to 0.65, a Relative Span of about 0.5 to about 0.8, optionally also QR values of from about 1.2 to about 1.5 and a $D_w/D_n$ value below 1.35. A second object of the invention has been to develop a new or modified furnace reactor which allows producing a carbon black composition that matches with the profile explained above. Finally it was also an object of the invention to provide new polymer compositions, in particular new rubber compositions showing improved wear resistance and reinforcement, especially for producing bus and truck tires.

DETAILED DESCRIPTION OF THE INVENTION

A first object of the present invention is directed to a modified furnace reactor, comprising the following elements:

(i) a combustion chamber;
(ii) a cylindrical tube for injection of the feedstock ("choke");
(iii) a Venturi shaped reaction tunnel for carbon black formation and
(iv) a cylindrical tunnel to terminate carbon black formation with a quench wherein
(a) the combustion chamber narrows conically over its length $l_1$ from a diameter $d_1$ to a diameter $d_2$;
(b) the tube shows over its length $l_2$ a constant diameter $d_2$;
(c) the reaction tunnel expands over its length $l_3$ from diameter $d_2$ to diameter $d_3$ and
(d) the cylindrical tunnel shows over its length $l_4$ a constant diameter $d_3$, on condition that the ratio $d_2:l_2$ ranges from about 1:2 to about 1:6.

Surprisingly, it has been observed that the desired new carbon black compositions with narrow ASD are obtainable using the furnace reactor with a modified geometry of the present invention. In particular, it has been found that enlarging the tube (ii) that shows a constant diameter until the diameter opens in Venturi shape, flow velocity is increased and back flow areas where the carbon black is formed are reduced or even avoided.

Unexpectedly, it was found that these changes in geometry lead to a significantly narrower distribution of aggregate sizes. More particularly, it was found that the ratio between the diameter of the constriction between combustion and reaction zone $d_2$ and the length of the tunnel $l_2$ showing a constant diameter, represents a reliable parameter to distinguish similar reactors providing only conventional ASD from reactors capable for obtaining the products of the present invention showing the desired narrow ASD.

Moreover, the new carbon black composition fulfils the complex requirements with respect to the improvement of the quality of the pigment and polymer compositions, into which the carbon black is incorporated. In particular one observes improvements in reinforcement and wear resistance of tire treads.

BRIEF DESCRIPTION OF THE DRAWINGS

The present invention will be described in greater detail with reference to the accompanying drawings in which.

CARBON BLACK COMPOSITION

A second object of the present invention is a carbon black composition showing
  a $\Delta D_{50}/D_{mode}$ value of 0.58 to 0.65, preferably 0.60 to 0.63, and more preferably 0.62 to 0.63;
  a Relative Span of about 0.50 to about 0.80, preferably about 0.55 to about 0.75, more preferably about 0.60 to about 0.72, and most preferably about 0.64 to about 0.70, and optionally;

a Quartile Ratio of about 1.2 to about 1.5, preferably about 1.30 to about 1.48 and more preferably about 1.35 to about 1.45, and/or a Polydispersity Index below about 1.35, preferably below about 1.33 and more preferably below about 1.31.

Also preferred are those carbon black compositions showing STSA value of about 90 to about 180 m$^2$/g, preferably about 100 to about 140 m$^2$/g or about 120 to 160 m$^2$/g wherein STSA represents the specific surface area of carbon black.

Also preferred are those carbon black composition showing an oil absorption number (OAN) of about 50 to about 400 ml/100 g, preferably 100 to about 200 ml/100 g, more preferably of about 115 to about 150 ml/100 g, and most preferably of about 120 to about 140 ml/100 g and/or an oil absorption number of compressed sample (COAN) of about 80 to about 130 ml/100 g, preferably of about 90 to about 120 ml/100 g, and more preferably of about 100 to about 115 ml/100 g. Particular preferred is also a range of about 95 to about 105 ml/100 g.

A third object of the invention relates to a carbon black composition showing a $\Delta D_{50}/D_{mode}$ value of about 0.58 to about 0.65, preferably about 0.60 to about 0.63, and more preferably about 0.62 to about 0.63;

a Relative Span of about 0.50 to about 0.80, preferably about 0.55 to about 0.75, more preferably about 0.60 to about 0.72, and most preferably about 0.64 to about 0.70, and optionally;

a Quartile Ratio of about 1.2 to about 1.5, preferably about 1.30 to about 1.48 and more preferably about 1.35 to about 1.45, and/or a Polydispersity Index below about 1.35, preferably below about 1.33 and more preferably below about 1.31.

obtainable in that (A) a hydrocarbon starting material is subjected into a high temperature combustion gas stream in order to achieve thermal decomposition;

(B) the reaction gases are cooled and (C) the carbon black thus obtained is recovered, wherein the reaction is conducted in a furnace reactor comprising the following elements:

(i) a combustion chamber;

(ii) a cylindrical tube for injection of the feedstock ("choke");

(iii) a Venturi shaped reaction tunnel for carbon black formation and (iv) a cylindrical tunnel to terminate carbon black formation with a quench wherein (a) the combustion chamber narrows conically over its length $l_1$ from a diameter $d_1$ to a diameter $d_2$;

(b) the tube shows over its length $l_2$ a constant diameter $d_2$;

(c) the reaction tunnel expands over its length $l_3$ from diameter $d_2$ to diameter $d_3$ and (d) the cylindrical tunnel shows over its length $l_4$ a constant diameter $d_3$, on condition that the ratio $d_2:l_2$ ranges from about 1:2 to about 1:6.

Furnace Reactor and Manufacturing Process

Another object of the present invention relates to a process for obtaining a carbon black composition showing a $\Delta D_{50}/D_{mode}$ value of about 0.58 to about 0.65, preferably about 0.60 to about 0.63, and more preferably about 0.62 to about 0.63;

a Relative Span of about 0.50 to about 0.80, preferably about 0.55 to about 0.75, more preferably about 0.60 to about 0.72, and most preferably about 0.64 to about 0.70, and optionally;

a Quartile Ratio of about 1.2 to about 1.5, preferably about 1.30 to about 1.48 and more preferably about 1.35 to about 1.45, and/or a Polydispersity Index below 1.35, preferably below 1.33 and more preferably below 1.31.

comprising the following steps:

(A) subjecting a hydrocarbon starting material into a high temperature combustion gas stream in order to achieve thermal decomposition;

(B) cooling the reaction gases and (C) recovering of the carbon black thus obtained, wherein the reaction is conducted in a furnace reactor comprising the following elements:

(i) a combustion chamber;

(ii) a cylindrical tube for injection of the feedstock ("choke");

(iii) a Venturi shaped reaction tunnel for carbon black formation and (iv) a cylindrical tunnel to terminate carbon black formation with a quench wherein (a) the combustion chamber narrows conically over its length $l_1$ from a diameter $d_1$ to a diameter $d_2$;

(b) the tube shows over its length $l_2$ a constant diameter $d_2$;

(c) the reaction tunnel expands over its length $l_3$ from diameter $d_2$ to diameter $d_3$ and (d) the cylindrical tunnel shows over its length $l_4$ a constant diameter $d_3$, on condition that the ratio $d_2:l_2$ ranges from about 1:2 to about 1:6.

As explained above the centre of the present invention refers to the modified furnace reactor with improved geometry which for the first time allows producing a carbon black composition with a narrow aggregate size distribution showing a $\Delta D_{50}/D_{mode}$ value of about 0.58 to about 0.65, preferably about 0.60 to about 0.63, and more preferably about 0.62 to about 0.63;

a Relative Span of about 0.50 to about 0.80, preferably about 0.55 to about 0.75, more preferably about 0.60 to about 0.72, and most preferably about 0.64 to about 0.70, and optionally;

a Quartile Ratio of about 1.2 to about 1.5, preferably about 1.30 to about 1.48 and more preferably about 1.35 to about 1.45, and/or a Polydispersity Index below 1.35, preferably below 1.33 and more preferably below 1.31.

While the features (A), (B) and (C) as set out above describe the standard procedure to obtain carbon black, the geometry of the reactor, in particular the geometry of the choke and the Venturi shaped reaction tunnel is essential and represents the most critical feature.

Figure 1:
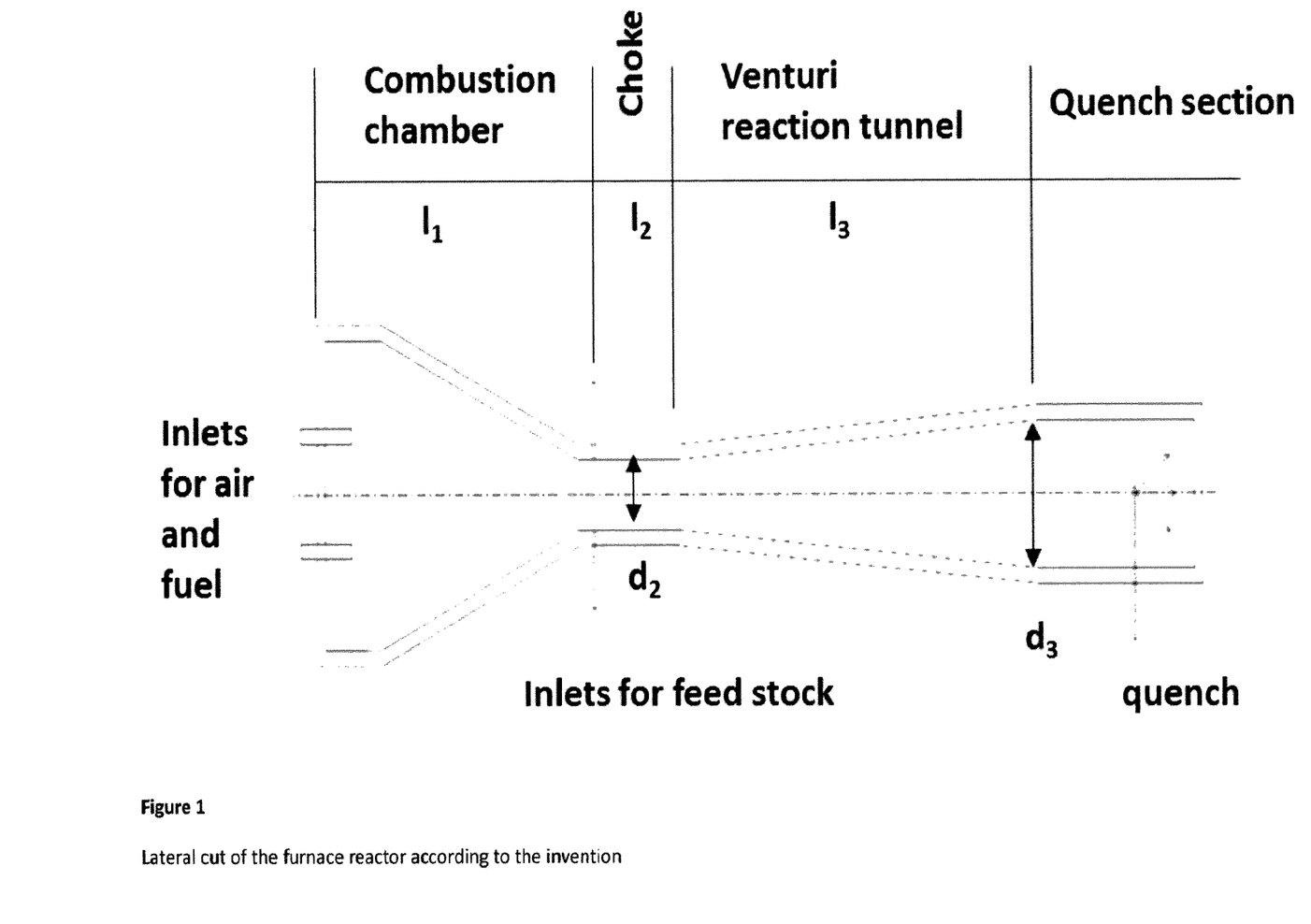
FIG. 1 illustrates a cross-sectional view of the furnace reactor according to the present invention.
Figure 2:
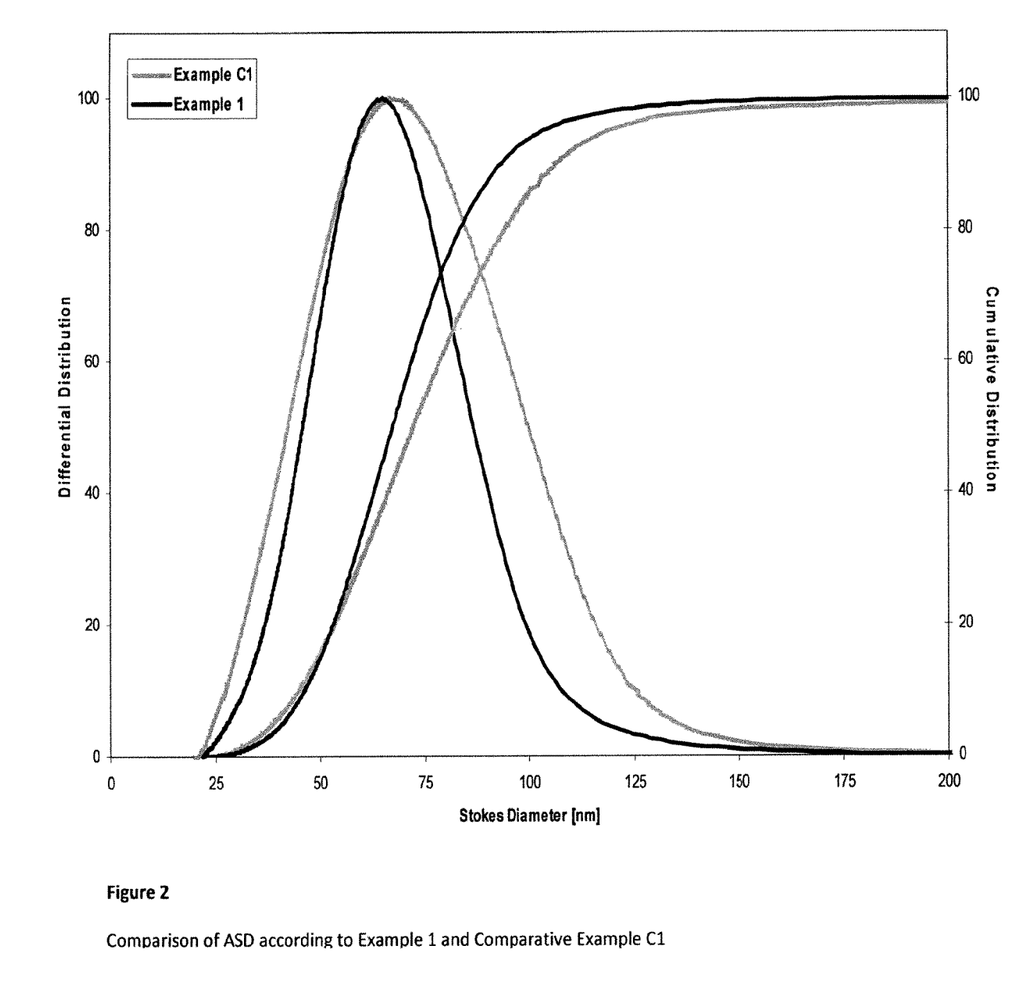
FIG. 2 is a graph comparing the aggregate size distribution of the carbon black compositions prepared according to Example 1 and Comparative Example C1.

The geometry of the new reactor is depicted in FIG. 1. The conical shaped combustion chamber has a total length $l_1$ of about 1.400 to 1.800 mm, preferably about 1.600 mm, while the diameter decreases from $d_1$=about 800 to about 1.000 mm, preferably about 900 mm to $d_2$=about 100 to about 200 mm, preferably about 110 to about 125 mm. Said diameter $d_2$ represents the diameter of the choke that connects the combustion chamber with the reaction tunnel.

It is a critical feature of the invention to increase flow velocity in this area and avoid or at least reduce back flow areas where the carbon black is formed, since low flow velocity and high back flow has been identified as the driving parameters especially with regard to the formation of unwanted large particles. Typically, the choke has a length $l_2$ of about 350 to about 600 mm, preferably about 450 mm. The crucial parameter for successfully carrying out the invention is the ratio of diameter $d_2$ and length of the choke $l_2$, which is claimed to be about 1:2 to about 1:6, and preferably about 1:3.5 to about 1:4.5.

The carbon black formation starts in the choke after the feedstock injection. This choke with its diameter $d_2$ turns into the Venturi shape tunnel, where the formation of the carbon black continues. The tunnel opens with an angle of 3 to 4° to a final diameter $d_3$ of about 200 to about 300 mm, preferably about 250 mm. The length $l_3$ of the tunnel is about 900 to about 1.800 mm, preferably about 1.000 to about 1.300 mm.

The final section of the reactor is the quench section, which has a cylindrical shape and a diameter of $d_3$. Its length $l_4$ is not critical and may vary between about 500 to about 2.000 mm. In order to finish the formation of the carbon black and to avoid unwanted side reaction with the process gases the cooling tunnel is equipped with nozzles ("chokes") allowing to introduce water or special liquids to quench the reaction gases.

The process as described above comprises
(a) a combustion step;
(b) a reaction step and
(c) a step for terminating the reaction, may be the same as for a conventional process.

Specifically, in the combustion step, in order to form a high temperature combustion gas, air as an oxygen-containing gas and a gaseous or liquid fuel hydrocarbon will be mixed and burned (this zone is called a combustion zone). As the fuel hydrocarbon, hydrogen, carbon monoxide, natural gas, coal gas, petroleum gas, a petroleum type liquid fuel such as heavy oil, or a coal type liquid fuel such as creosote oil, may be used. The combustion zone is desired to be a sufficiently high temperature atmosphere so that the starting material hydrocarbon can be uniformly vaporized and thermally decomposed, and the temperature is preferably at least 1,600° C., more preferably from 1,700 to 2,400° C. Another condition desired for the combustion zone is to suppress the oxygen concentration in the combustion gas as far as possible. If oxygen is present in the combustion gas, partial combustion of the starting material hydrocarbon is likely to take place in the reaction zone, whereby non-uniformity in the reaction zone is likely to result.

The oxygen concentration in the combustion gas is adjusted by the k-factor. The k-factor is used as an index number to characterize the excess air. It represents the ratio between the amount of air which for stoichiometric combustion is needed and the real amount of air which is used for the combustion. Preferably the k-factor is adjusted from 0.3 to 1.0, more preferably from 0.6 to 0.8. The amount of combustion air is typically about 2,500 to about 10,000 Nm³/h, and more preferably about 2,800 to about 3,000 Nm³/h, while its temperature ranges typically from about 300 to 900° C.

In the reaction step, a starting material hydrocarbon is introduced into the high temperature combustion gas stream obtained in the combustion step, as it is jetted from a burner provided in parallel with or in a transverse direction to the high temperature combustion gas stream, whereupon the starting material hydrocarbon is thermally decomposed and converted to carbon black (this zone is called a reaction zone). It is common to provide a choke in the reaction zone in order to improve the reaction efficiency, and the degree of the choke is such that the ratio of the diameter of the choke to the diameter of the upstream portion of the choke is from 0.1 to 0.8.

The starting material hydrocarbon may, for example, be an aromatic hydrocarbon such as anthracene, CTD (Coal Tar Distillate), ECR (Ethylene Cracker Residue) or a petroleum type heavy oil such as FCC oil (fluidized catalytic decomposition residual oil).

Introduction of the starting material hydrocarbon into the reaction zone is preferably carried out so that the starting material is finely sprayed and uniformly dispersed in the furnace so that oil drops of the starting material hydrocarbon can uniformly be vaporized and thermally decomposed. As a method for fine spraying, it is effective to employ a method of atomizing by the combustion gas stream. The flow rate of the combustion gas at the position for introduction of the starting material hydrocarbon is preferably at least 250 m/sec, more preferably from 300 to 500 m/sec. Further, in order to uniformly disperse the starting material in the furnace, introduction of the starting material is preferably carried out in such a manner that the starting material hydrocarbon is introduced into the furnace from multiple nozzles, at least 2 nozzles, more preferably from 3 to 12 and more particularly from 4 to 16 nozzles.

The aggregate is believed to be formed in such a manner that the starting material hydrocarbon is uniformly vaporized and thermally decomposed, whereby nuclei of a precursor will form and mutually collide to one another to fuse and be carbonized to form the aggregate. Accordingly, it is considered to be advisable that the aggregate formation zone is free from a highly turbulent site due to e.g. a change in the flow path such as in a choke. This can be accomplished by adjusting the residence time in the choke to be at least 0.4 sec after introduction of the starting material hydrocarbon.

In the step for terminating the reaction, the high temperature reaction gas is cooled to a level of not higher than 1,000 to 800° C. by e.g. water spray (this zone is called a quench section). The cooled carbon black can be recovered by a conventional process, for example, by a process of separating it from the gas by means of e.g. a collecting bag filter. Typically, the temperature at the outlet of the reactor is about 500 to about 1,000° C.

INDUSTRIAL APPLICATION

The first part of the invention is directed to a carbon black composition with narrow ASD and a method for obtaining such composition using a new or modified furnace reactor.

The following part of the invention is dedicated to the application of the new carbon black composition as an additive or a pigment that shows superior performance compared to standard products from the market exhibiting a broader, conventional ASD.

Additives for Polymer Compositions

Therefore, another object of the present invention is directed to a method for improving the properties of a polymer composition by adding the new carbon black composition showing a $\Delta D_{50}/D_{mode}$ value of about 0.58 to about 0.65, preferably about 0.60 to about 0.63, and more preferably about 0.62 to about 0.63;

a Relative Span of about 0.50 to about 0.80, preferably about 0.55 to about 0.75, more preferably about 0.60 to about 0.72, and most preferably about 0.64 to about 0.70, and optionally;

a Quartile Ratio of about 1.2 to about 1.5, preferably about 1.30 to about 1.48 and more preferably about 1.35 to about 1.45, and/or a Polydispersity Index below 1.35, preferably below 1.33 and more preferably below 1.31.

Also claimed is the use of said composition as an additive for polymer compositions.

Although the polymer may encompass a variety of different types, such as polyethylene, polypropylene, polystyrene, polyesters, polyurethanes and the like, the preferred polymer is a synthetic or natural rubber.

Natural rubber, coming from latex of *Havea Brasiliensis*, is mainly poly-cis-isoprene containing traces of impurities like protein, dirt etc. Although it exhibits many excellent properties in terms of mechanical performance, natural rubber is often inferior to certain synthetic rubbers, especially with respect to its thermal stability and its compatibility with petroleum products.

Synthetic rubber is made by the polymerization of a variety of petroleum-based precursors called monomers. The most prevalent synthetic rubbers are styrene-butadiene rubbers (SBR) derived from the copolymerization of styrene and 1,3-butadiene. Other synthetic rubbers are prepared from isoprene (2-methyl-1,3-butadiene), chloroprene (2-chloro-1,3-butadiene), and isobutylene (methyl propene) with a small percentage of isoprene for-cross-linking. These and other monomers can be mixed in various proportions to be copolymerized to produce products with a wide range of physical, mechanical, and chemical properties. The monomers can be produced pure and the addition of impurities or additives can be controlled by design to give optimal properties. Polymerization of pure monomers can be better controlled to give a desired proportion of cis and trans double bonds. With respect to polymers of the synthetic or natural rubber type, another object of the present invention is a method for improving wear resistance and reinforcement, and of such polymer compositions.

The invention also encompasses the use of such carbon black compositions for achieving said effect when added to a rubber composition. The amounts of carbon black to be added to a polymer in general and particularly to a rubber ranges from about 10 to about 120 phr[1], preferably about 35 to about 100 phr and more preferably about 40 to 60 phr.

[1] phr=parts per hundred parts rubber

Pigment Applications

Another object of the present invention refers to use of the new carbon black composition as a pigment, in particular as a black pigment for various purposes such as paints and lacquers.

Carbon black represents the ideal black pigment because it is lightfast, resistant to chemical attack and shows a deep black color that makes it superior to other inorganic pigments, such as iron oxides. It is mainly used for two applications, pure black coatings, for which the jetness is the dominating parameter, and gray coatings and paints, for which the tinting strength is more important. The first category includes carbon black pigments mainly with small primary particle sizes, and the second one with medium to large particle sizes. The primary purpose of black and gray coatings is decoration and protection. In black coatings, i.e. mass tone coloration, the fine particle size blacks show a bluish undertone whereas coarse blacks exhibit a brownish undertone. Deep black coatings are predominantly demanded from the automobile and furniture industry. However, carbon blacks which exhibit a pronounced blue undertone are even more requested. This is due to the fact that a bluish black is seen to be darker than one with a brownish undertone. Up to now this could be only fulfilled by producing carbon blacks with ever more smaller sizes. Because aggregates are the smallest dispersible units the ASD also has an impact on the jetness (blackness) and particularly on the undertone (more bluish). The more narrow the ASD in particular the more symmetrical the ASD the less the amount of coarse particles (aggregates) and hence the more bluish the undertone.

As black pigments for deep colouring of plastics mainly carbon blacks of the high colour (HC) and medium colour (MC) class are used. These blacks are found in a great variety of end products such as panelling, casings, fibbers, sheeting, footwear etc., many of them being injection moulded articles. To increase the jetness of a polymer as determined by the blackness $M_y$, one can use a carbon black with smaller sizes of primary particles, low structure blacks or increase the carbon black concentration. Using the first two options the dispersion of the carbon blacks becomes more difficult and can lead to the opposite effect. The concentration of carbon blacks in polymers can be increased only to a certain amount in practice because the mechanical properties of many plastics are usually adversely affected at higher concentrations. Carbon blacks offering a narrow in particular a more symmetrical ASD lead to a higher jetness in polymers without worsen the mechanical properties or decreasing the dispersion behaviour.

In inkjet ink application the trend is towards smaller droplets, which requires print-head nozzles with diameters of just a few micrometers. Prevention of nozzle clogging and deposits on the print-head are essential to ensure long-term print reliability. Particle fineness (aggregates) of the pigment is one of the key roles to fulfil these requirements in print reliability. Especially few amounts of coarser particles influence the filtration properties as well as the printability of final pigmented inkjet inks. The more narrow the ASD the less the amount of coarse particles (aggregates) and hence the lower risk of print unreliability.

The carbon black may be present in said pigment compositions in amounts of from about 0.3 to about 45% b.w., preferably about 1 to about 25% b.w.

Polymer Compositions, Rubber Compositions and Final Products

Another object of the present invention is a polymer comprising the new carbon black composition showing a $\Delta D_{50}/D_{mode}$ value of about 0.58 to about 0.65, preferably about 0.60 to about 0.63, and more preferably about 0.62 to about 0.63;

a Relative Span of about 0.50 to about 0.80, preferably about 0.55 to about 0.75, more preferably about 0.60 to about 0.72, and most preferably about 0.64 to about 0.70, and optionally;

a Quartile Ratio of about 1.2 to about 1.5, preferably about 1.30 to about 1.48 and more preferably about 1.35 to about 1.45, and/or a Polydispersity Index below 1.35, preferably below 1.33 and more preferably below 1.31

The polymer may be selected from the group consisting of polyethylene, polypropylene, polystyrene, polyesters, polyurethanes, but preferably the polymer is either a synthetic or natural rubber.

The carbon black may be present in said pigment compositions in amounts of from about 0.3 to about 45% b.w., preferably about 1 to about 25% b.w.

In case, the polymer composition is a rubber composition that is designated to deal as a basis for tires, such compositions generally comprise elastomer compositions, reinforcing fillers and partly silane coupling agents. The compositions may be cured using a sulphur vulcanizing agent and various processing aids, including accelerators.

Rubbers

Any conventionally used rubber compounding elastomer is potentially suitable for the rubber compositions covered by the present invention. Non-limiting examples of elastomers potentially useful in the exemplary composition include the following, individually as well as in combination, according to the desired final viscoelastic properties of the rubber compound: natural rubber, polyisoprene rubber, styrene butadiene rubber, polybutadiene rubber, butyl rubbers, halobutyl rubbers, ethylene propylene rubbers, cross linked polyethylene, neoprenes, nitrile rubbers, chlorinated polyethylene rubbers, silicone rubbers, specialty heat and oil resistant rubbers, other specialty rubbers, and thermoplastic rubbers, as such terms are employed in The Vanderbilt Rubber Handbook, Thirteenth Edition, (1990). These elastomers may contain a variety of functional groups, including, but not limited to tin, silicon, and amine containing functional groups.

The ratios of such polymer blends can range across the broadest possible range according to the final viscoelastic properties desired for the polymerized rubber compound. One skilled in the art, without undue experimentation, can readily determine which elastomers and in what relative amounts are appropriate for a resulting desired viscoelastic property range. The rubber compositions may include
- liquid hydroxyl terminated polyalkylenes;
- halogenated co-polymers of isobutylene and p-methylstyrene, or both;
- EPDM-based rubbers;
- halogenated co-polymers of isoolefin and para-alkylstyrene;
- styrene-butadiene rubbers, including high trans styrene-butadiene rubbers and/or
- high vinyl polybutadiene elastomers.

Reinforcing Fillers

Typically, the rubber compositions are compounded with reinforcing fillers, including carbon black and silica. The carbon black may be present in amounts ranging from about 10 to about 120 phr, or from about 35 to about 100 phr or from about 40 to about 60 phr. The carbon blacks may be in pelletized form or an unpelletized flocculent mass.

Examples of suitable silica reinforcing fillers include, but are not limited to, hydrated amorphous silica, precipitated amorphous silica, wet silica (hydrated silicic acid), dry silica (anhydrous silicic acid), fumed silica, calcium silicate, and the like.

Silane Coupling Agents

Silica coupling agents may be used to chemically bind the silica to the rubber. Generally speaking, any conventional type of silica coupling agent may be used, such as those having a silane and a constituent component or moiety that can react with the rubber, particularly a sulphur vulcanizable rubber. The coupling agent thus acts as a connecting bridge between the silica and the rubber. The rubber reactive group of a silane coupling agent includes mercapto, polysulphide, amino, vinyl, and epoxy groups. Examples of suitable silica coupling agents include N-(β-(aminoethyl)-aminopropylt-rimethoxysilane, γ-aminopropyltriethoxy silane, bis (β-hydroxyethyl)-γ-aminopropyltriethoxy silane, (β-(3,4-epoxy-cyclohexyl)-ethyltrimethoxy silane, γ-glycidoxypropyltrimethoxy silane, γ-methacryloxypropyl-trimethoxysilane, vinyl trichlorosilane, vinyl triethoxysilane, and vinyl tris(β-methoxyethyl) silane. In general, silane coupling agents may contain a polysulphide component, or structure, such as, for example, a bis(3-alkoxysilylalkyl) polysulphide where the alkyl radicals for the alkoxy group are selected from methyl and ethyl radicals, the alkyl radical for the silane portion are selected from ethyl, propyl, and butyl radicals, and the polysulphidic bridge contains: (a) from 2 to 6, and an average of from 2.1 to 2.8, sulphur atoms; or (b) from 2 to 8, and an average of from 3.5 to 4.5, sulphur atoms.

A representative example of such a coupling agent is bis-(3-triethoxysilylpropyl)-polysulphide having: (a) from 2 to 6, and an average of from 2.1 to 2.8, sulphur atoms in its polysulphidic bridge; or (b) from 2 to 8, and an average of from 3.5 to 4.5, sulphur atoms in its polysulphidic bridge. Exemplary coupling agents include bis(3-triethoxysilylpropyl)-tetrasulphide, also known as Si69®, manufactured by Evonik, and bis(3-triethoxysilylpropyl)-disulphide. Other additional coupling agents include 3-octanoylthio-1-propyltriethoxy silane and mercapto-functional organosilanes. Additional suitable silane coupling agents are set forth in EP 0857752 B1, which is incorporated by reference herein in its entirety.

The amount of the silica coupling agent may vary, but generally is from about 3 to about 24 phf[2] or from about 15 to about 13 phf.

[2] phf=parts per hundred parts filler

Rubber Compounding Components

Processing aids. The rubber composition may be compounded by, for example, mixing the various sulphur-vulcanizable constituent rubbers with various commonly used additive materials such as, for example, curing aids such as sulphur, activators, retarders, and accelerators, processing additives, such as oils, resins including tackifying resins, silicas, and plasticizers, fillers, pigments, fatty acid, zinc oxide, waxes, antioxidants and antiozonants, peptizing agents, and reinforcing materials such as, for example, carbon black.

An amount of processing aids may be from about 0 to about 10 phr. Such processing aids may include, for example, aromatic, naphthenic, and/or paraffinic processing oils. Typical amounts of antioxidants may comprise from about 1 to about 5 phr. Representative antioxidants may be, for example, diphenyl-p-phenylenediamine, TMQ, and others such as, for example, those disclosed in The Vanderbilt Rubber Handbook (1978), pages 344-346. Typical amounts of antiozonants, such as N-(1,3-dimethylbutyl)-N'-phenyl-1,4-benzene diamine (6PPD), may comprise from about 1 to 5 phr. Typical amounts of fatty acids, if used, which can include stearic acid, may comprise from about 0.5 to about 3 phr. Typical amounts of zinc oxide may comprise from about 1 to about 5 phr. Typical amounts of waxes may comprise from about 1 to about 5 phr. Often microcrystalline waxes are used. Typical amounts of peptizers may comprise from about 0.1 to about 1 phr. Typical peptizers may be, for example, pentachlorothiophenol and dibenzamidodiphenyl disulphide. Process aids, such as phenolic resin (about 2 phr) and C5 aliphatic HC resin (about 5 phr) (tackifiers) may also be useful.

Vulcanization Agents.

The vulcanization may be conducted in the presence of a sulphur vulcanizing agent. Examples of suitable sulphur vulcanizing agents include elemental sulphur (free sulphur) or sulphur donating vulcanizing agents, for example, an amine disulphide, polymeric polysulphide, or sulphur olefin adducts. Sulphur vulcanizing agents may be used in an amount ranging from about 0.5 to about 8 phr.

Accelerators.

Accelerators are used to control the time and/or temperature required for vulcanization and to improve the properties of the vulcanizate. In one embodiment, a single accelerator system may be used, i.e., a primary accelerator. A primary accelerator is used in total amounts ranging from about 0.5 to about 4 phr. In another embodiment, combinations of a primary and a secondary accelerator might be used with the secondary accelerator being used in smaller amounts (of about 0.05 to about 3 phr) in order to activate and to improve the properties of the vulcanizate. In addition, delayed action accelerators may be used which are not affected by normal processing temperatures, but produce a satisfactory cure at ordinary vulcanization temperatures. Vulcanization retarders might also be used. Suitable types of accelerators that may be used are amines, disulphides, guanidines, thioureas, thiurams, sulphonamides, dithiocarbamates, xanthates, and sulphenamides. The primary accelerator may also be a thiazole, such as a benzothiazole-based accelerator. Exemplary benzothiazole-based accelerators may include N-cyclohexyl-2-benzothiazole sulphonamide (CBS), N-tert-butyl-2-benzothiazole sulphenamide (TBBS), 4-oxydiethylene-2-benzothiazole sulphenamide (OBTS), N,N'-dicyclohexyl-2-benzothiazole sulphenamide (OCBS), 2-mercaptobenzothiazole (MBT), and dibenzothiazole disulphide (MBTS), and may be present in an amount of from about 0.8 to about 1.2 phr. In one embodiment, the amount of the benzothiazole accelerator may be from about 30 to about 60% b.w. of the sulphur vulcanizing agent.

Pneumatic Tires

A final object of the present invention is directed to a pneumatic tire comprising the new carbon black composition or a rubber composition that comprises said carbon black composition as an additive. Preferably, said tire is a bus tire or a truck tire.

The pneumatic tire according to an embodiment of the invention shows improved the wear resistance and low heat build-up by using the aforementioned carbon black compositions and/or rubber compositions comprising said carbon black compositions for the tire tread in a tread portion. Moreover, the pneumatic tire according to this embodiment has a conventionally known structure and is not particularly limited, and can be manufactured by the usual method. Also, as a gas filled in the pneumatic tire according to the embodiment can be used air or air having an adjusted oxygen partial pressure but also an inert gas such as nitrogen, argon, helium or the like.

As an example of the pneumatic tire is preferably mentioned a pneumatic tire comprising a pair of bead portions, a carcass torpidly extending between the bead portions, a belt hooping a crown portion of the carcass and a tread, or the like. The pneumatic tire according to the embodiment of the invention may have a radial structure or a bias structure.

The structure of the tread is not particularly limited, and may has a one layer structure or a multi-layer structure or a so-called cap-base structure constituted with an upper-layer cap portion directly contacting with a road surface and a lower-layer base portion arranged adjacent to the inner side of the cap portion in the pneumatic tire. In this embodiment, it is preferable to form at least the cap portion with the rubber composition according to the embodiment of the invention. The pneumatic tire according to the embodiment is not particularly limited in the manufacturing method and can be manufactured, for example, as follows. That is, the rubber composition according to the above embodiment is first prepared, and the resulting rubber composition attached onto an uncured base portion previously attached to a crown portion of a casing in a green pneumatic tire, and then vulcanization-built in a given mould under predetermined temperature and pressure.

EXAMPLES

Examples 1 to 3

Preparation of a Carbon Black Composition with Narrow ASD

A furnace reactor was installed with a structure as depicted in FIG. 1. In particular, the furnace reactor had a combustion chamber with a length $l_1$ of 1.605 mm, which narrowed from a diameter $d_1$ of 930 mm to a constriction of 114 mm. The reactor was provided with duct for introducing air and fuel and a combustion burner. The combustion chamber was connected to a choke having a constant diameter $d_2$ of 114 mm and a length $l_2$ of 456 mm. The choke was equipped with a plurality of nozzles for introducing the starting material provided along the circumference and connected to the Venturi shapes reaction tunnel having a length $l_3$ of 1.180 mm and a diameter $d_2$ of 114 mm that opened to a diameter $d_3$ of 240 mm. The reaction tunnel finally was connected to a cylindrical quench section of about 1.500 mm. Both tunnels were equipped with a quenching apparatus. An example of the reaction conditions is shown in the following Table 1.

TABLE 1

| Example of reaction conditions for making carbon black with narrow ASD | |
|---|---|
| Parameter | Standard conditions |
| Combustion air [$Nm^3/h$] | 2,600-2,900 |
| Combustion air temperature [° C.] | 360-620 |
| Feedstock type | Standard oil |
| Feedstock amount [kg/h] | 710 |
| Gas amount [$Nm^3/h$] | 224-239 |
| Temperature reactor outlet [° C.] | 560-800 |

Once the reaction was completed the product was recovered from the reactor and forwarded into the final carbon black production process. Samples of the product were subjected to analysis in order to determine the main properties. The methods are explained in the following in more detail:

Aggregate Size Distribution

The aggregate size distribution curves are measured using a Brookhaven BI-DCP disc centrifuge with red-light diode. This instrument is a development specifically for determining aggregate size distribution curves of finely divided solids from absorbance measurements, and is equipped with an automatic measuring and evaluation program for determining the aggregate size distribution. To carry out the measurements, first of all a dispersion solution is prepared in the following way: Add 200 ml of ethanol, 0.5 g Nonidet P40 Substitute, Fluka and 750 ml of demineralised water in a graduated 1 l flask. The solution is adjusted with 0.1 N NaOH solution to a pH of 9-10 and is then filled up with demineralised water to 1.000 ml.

Additionally a spin fluid is prepared in the following way: 0.25 g Nonidet P40 Substitute, Fluka are dissolved in 950 ml demineralised water. Afterwards the pH is adjusted to 9-10 with 0.1 N NaOH solution. Then the solution is filled up to 1.000 ml with demineralised water.

Subsequently 20 ml of dispersion solution are added to 20 mg of carbon black. The carbon black in the dispersion fluid is dispersed by sonification for a period of 4.5 min in a cooling bath using a Bandelin UW2200 sonifier with a tip DH 13G adjusted at 50% power and 80% pulse. Prior to the beginning of the actual measurements, the centrifuge is operated for 30 min at a speed of 11,000 rpm. The disk is stopped and 0.85 ml of ethanol are injected. Start the disk with a rotation speed of 11,000 rpm and inject 15 ml of the spin fluid; after that add additionally 0.15 ml of Ethanol. After about a minute, 250 µl of the carbon black suspension are injected, the instrument's measuring program is started, and the spin fluid in the centrifuge is overlaid with 50 µl of dodecane. Note the starting temperature (Ts) right after starting the measurement and note the end temperature (Te) right after the test. A duplicate determination is performed on each sample for measurement. The raw data curve is then evaluated using the instrument's arithmetic program, with correction for scattered light and with automatic baseline adaptation.

Figure 3:
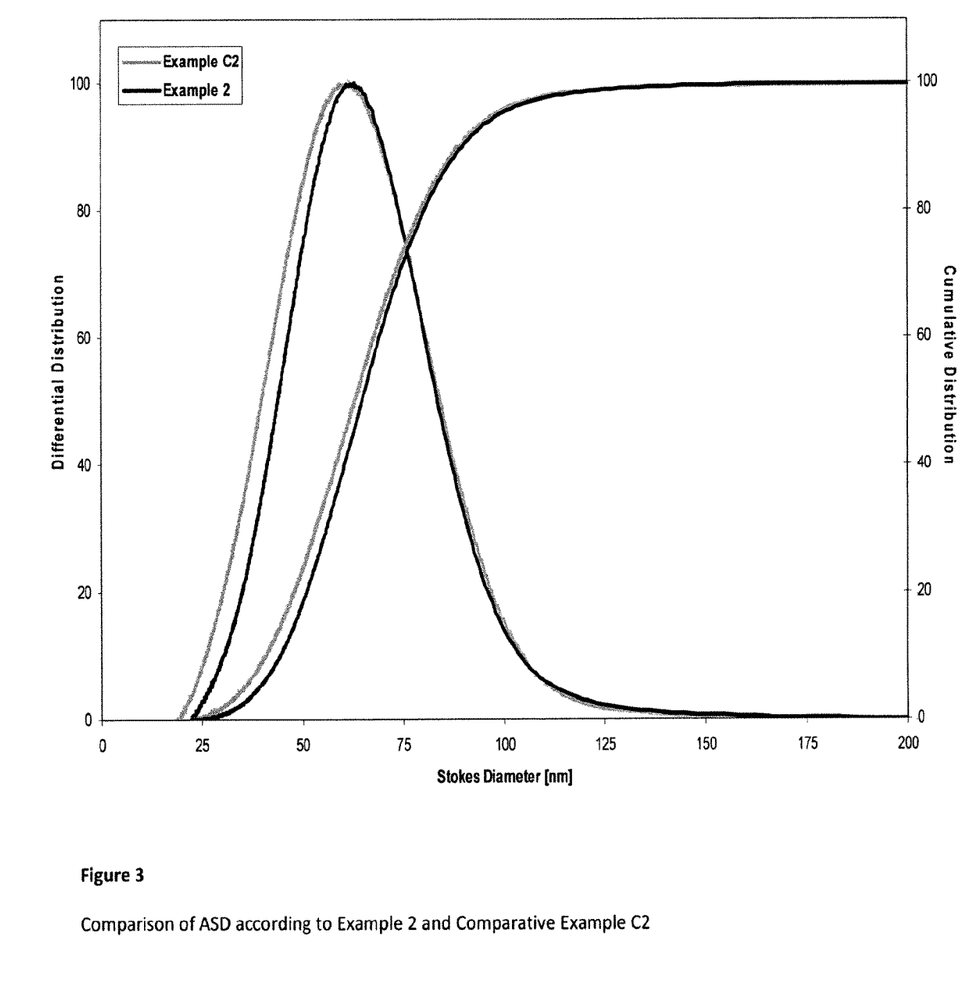
FIG. 3 is a graph comparing the aggregate size distribution of the carbon black compositions prepared according to Example 2 and Comparative Example C2.
Figure 4:
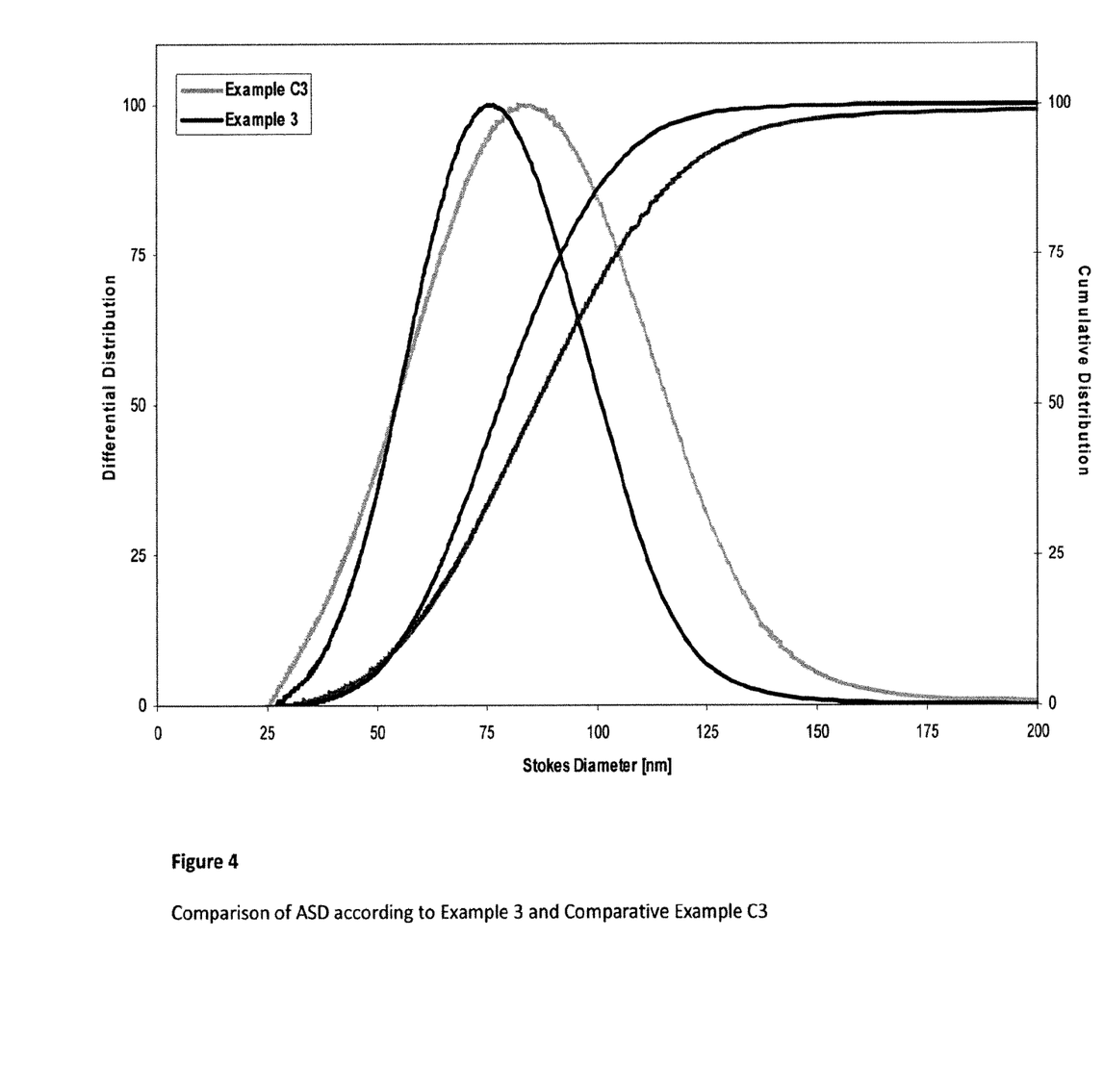
FIG. 4 is a graph comparing the aggregate size distribution of the carbon black compositions prepared according to Example 3 and Comparative Example C3.

The following parameters were used for software-based calculation:
Scattering corrections:
Correction Type: Mie Corrections,
File: CARBON.PRM (Carbon black in water)
Particle density: 1.86 g/cc
Spin fluid: water
Spin fluid volume: 15 ml
Temperature: $T=Ts+\frac{2}{3}\times(Te-Ts)$ The ASD distributions for the Examples 1 to 3 are shown in FIGS. 2 to 4. The three working examples were produced under the standard conditions explained above.

Iodine Adsorption

The Iodine adsorption is determined in accordance with ASTM D-1510.

BET Surface Area

The BET surface area is determined in accordance with ASTM D-6556

STSA Surface Area

The STSA surface area is determined in accordance with ASTM D-6556.

TINT

The tint strength is determined in accordance with ASTM D-3265.

Oil Absorption Number (OAN)

The Oil absorption number is determined in accordance with ASTM D-2414.

Oil Absorption Number of Compressed Sample (COAN)

Oil absorption number of compressed sample is determined in accordance with ASTM D-3493.

Comparative Examples C1 to C3

Three carbon black compositions obtainable in the market showing a conventional ASD and prepared on standard furnace reactors were used for comparison. The ASD distributions of Comparative Examples C1 to C3 are shown in FIGS. 2 to 4. Table 2 presents a comparison of the main analytical data of Examples 1 to 3 and Comparative Examples C1 to C3

TABLE 2

| Comparison between carbon black compositions | | | | | | |
|---|---|---|---|---|---|---|
| Parameter | 1 | C1 | 2 | C2 | 3 | C3 |
| Iodine adsorption [mg/g] | 120.8 | 120.7 | 145.0 | 145.9 | 111.0 | 91.9 |
| Surface Area BET [m²/g] | 117.0 | 120.0 | 134.0 | 138.3 | 105.0 | 91.0 |
| Surface Area STSA [m²/g] | 115.0 | 116.3 | 127.0 | 130.1 | 102.0 | 89.6 |
| OAN [ml/100 g] | 124.2 | 121.6 | 130.0 | 124.0 | 133.0 | 112.0 |
| COAN [ml/100 g] | 99.6 | 97.3 | 104.0 | 100.0 | 98.0 | 95.0 |
| Tint [%] | 131.8 | 119.9 | 137.0 | 129.4 | 125.1 | 111.9 |
| Aggregate size distribution | | | | | | |
| Average size (weight) = $D_w$ [nm] | 69 | 75 | 66 | 64 | 79 | 89 |
| Width (standard deviation) [nm] | 20 | 29 | 19 | 20 | 20 | 32 |
| $D_{mode}$ [nm] | 65 | 68 | 63 | 61 | 77 | 85 |
| $\Delta D_{50}$ [nm] | 41 | 57 | 39 | 44 | 46 | 62 |
| Relative Span (RS) | 0.698 | 0.855 | 0.700 | 0.767 | 0.641 | 0.767 |
| Quartile Ratio (QR) | 1.43 | 1.58 | 1.44 | 1.50 | 1.41 | 1.51 |
| Fraction > 150 nm [%] | 0.6 | 1.6 | 0.4 | 0.3 | 0.3 | 2.5 |
| $\Delta D_{50}/D_{mode}$ | 0.625 | 0.846 | 0.626 | 0.722 | 0.603 | 0.730 |
| Average size (number) = $D_n$ [nm] | 53 | 51 | 51 | 47 | 63 | 62 |
| Polydispersity = $D_w/D_n$ | 1.302 | 1.471 | 1.294 | 1.362 | 1.254 | 1.435 |

The comparison shows that the carbon black compositions according to the present invention include a less number of smaller aggregates, which has a positive impact on dispersion and re-flocculation, and also a less numbers of bigger aggregates, which has a positive impact on rubber reinforcement and wear performance. Also the tint has been significantly improved.

Properties of Carbon Black Compositions in a Rubber Compound

Rubber compounds were prepared according to general instruction known from the art and for example published in "Rubber Technology Handbook", W. Hofmann, Hanser Verlag, 1994. Three testing compositions according to the present invention and three standard formulations are compiled in the following Table 3; all amounts are given as phr. The compounds were prepared in a two-step process. The basic mixture of step 1 was prepared within 5 minutes using an internal mixer (Werner & Pfleiderer GK 1.5 E) at 50 rpm and a batch temperature of 145 to 155° C. For obtaining the final mixture of step 2 the basic mixtures was treated with sulphur and the stabilization agent and mixed for another 2 minutes at 50 rpm and 100 to 110° C. Finally, the compounds were given on a mill to produce rubber sheets.

black according to the present invention, in particular with respect to reinforcement.

Wear Resistance

The wear resistance, also called abrasion resistance was determined according to the method described in Grosch, K. A., the 131$^{th}$ ACS Rubber Div. Meeting, No. 97 (1987) and Grosch, K. A. et al., Kautschuk Gummi Kunststoffe, 50, 841 (1997).

TABLE 3

Rubber compositions

| Compound references | Examples | | | | | |
|---|---|---|---|---|---|---|
| | 1<br>C-A1 | C1<br>C-C1 | 2<br>C-A2 | C2<br>C-C2 | 3<br>C-A3 | C3<br>C-C3 |
| Step 1 | | | | | | |
| Natural rubber SMR10 (Weber & Schaer GmbH) | 100 | 100 | 100 | 100 | 100 | 100 |
| Carbon black from Example 1 | 52.0 | — | — | — | — | — |
| Carbon Black from Comparative Example C1 | — | 52.0 | — | — | — | — |
| Carbon black from Example 2 | — | — | 52.0 | — | — | — |
| Carbon Black from Comparative Example C2 | — | — | — | 52.0 | — | — |
| Carbon black from Example 3 | — | — | — | — | 52.0 | — |
| Carbon Black from Comparative Example C3 | — | — | — | — | — | 52.0 |
| Stearic acid (Edenor ST1, BASF) | 3.0 | 3.0 | 3.0 | 3.0 | 3.0 | 3.0 |
| Zinc oxide (Rhein-Chemie GmbH) | 3.0 | 3.0 | 3.0 | 3.0 | 3.0 | 3.0 |
| Vulkanox ® 4020 (Lanxess AG) | 1.0 | 1.0 | 1.0 | 1.0 | 1.0 | 1.0 |
| Vulkanox ® HS (Lanxess AG) | 1.0 | 1.0 | 1.0 | 1.0 | 1.0 | 1.0 |
| Protektor ® G3108 (Arnsperger Chem. GmbH) | 1.0 | 1.0 | 1.0 | 1.0 | 1.0 | 1.0 |
| Step 2 | | | | | | |
| Batch Step 1 | 100 | 100 | 100 | 100 | 100 | 100 |
| Sulphur (KMS Laborchemie) | 1.5 | 1.5 | 1.5 | 1.5 | 1.5 | 1.5 |
| Rhenogran ® TBBS-80 (Rhein-Chemie GmbH) | 1.2 | 1.2 | 1.2 | 1.2 | 1.2 | 1.2 |

The results of the rubber tests are compiled in the following Table 4.

TABLE 4

Results of rubber tests

| Ingredient | Method | C-A1 | C-C1 | C-A2 | C-C2 | C-A3 | C-C3 |
|---|---|---|---|---|---|---|---|
| Cure behaviour | | | | 15 min/150° C. | | | |
| Stress-strain properties (ring) | | | | | | | |
| Tensile strength [MPa] | DIN 53504, | 25.5 | 24.0 | 23.8 | 23.0 | 22.2 | 21.6 |
| 100% Modulus [MPa] | ISO 37 | 2.5 | 2.2 | 2.7 | 2.2 | 2.6 | 2.4 |
| 200% Modulus [MPa] | | 7.3 | 6.4 | 8.2 | 6.7 | 8.1 | 7.2 |
| 300% Modulus [MPa] | | 13.9 | 12.5 | 15.4 | 13.1 | 15.1 | 13.8 |
| Elongation at break [%] | | 490 | 470 | 462 | 493 | 444 | 458 |
| Modulus 300/Modulus 100 | | 5.6 | 5.7 | 5.7 | 6.0 | 5.8 | 5.8 |
| Shore A hardness [°] | DIN 53505<br>ISO 7619-1 | 69 | 66 | 68 | 65 | 67 | 64 |
| Viscoelastic properties (Goodrich Flexometer 0.175 inch/2 h) | | | | | | | |
| At contact temperature [° C.] | DIN 53533<br>ASTM D623A | 57 | 54 | 67 | 66 | 60 | 58 |
| At centre temperature [° C.] | | 97 | 92 | 120 | 122 | 104 | 99 |
| Permanent set [%] | | 5.7 | 5.4 | 7.6 | 8.4 | 7.4 | 5.3 |
| Ball rebound 60° C. [%] | ASTM D2632 | 61.2 | 60.7 | 57.1 | 56.9 | 60.4 | 62.6 |
| E* 60° C. [MPa] | DIN 53513 | 10.4 | 9.6 | 11.0 | 9.7 | 10.3 | 9.1 |
| tan δ 60° C. | ISO 4664-1 | 0.140 | 0.139 | 0.163 | 0.164 | 0.151 | 0.132 |
| S' 60° C. [dNm]* | | 26.9 | 23.3 | 26.9 | 25.5 | 24.8 | 22.0 |
| S" 60° C. [dNm]* | | 5.2 | 4.4 | 5.7 | 5.3 | 4.8 | 3.8 |
| tan δ 60° C.* | | 0.192 | 0.188 | 0.210 | 0.209 | 0.193 | 0.174 |
| Dispersion (Topo)/P.A.** | | 1.9 | 1.4 | 1.0 | 1.8 | 1.6 | 1.5 |

*The dynamic shear strain for determining the torsional moments S' and S" and the according tan δ values was conducted using a RPA 2000 device provided by Alpha Technologies UK, 74078 Heilbronn.
**As set out in DE 1991975 A1

The comparison clearly demonstrates the superior performance of the rubber composition comprising the carbon The results for the rubber compositions according to Example 1 to 3 and Comparative Examples C1 to C3 are presented in the following Table 5. The abrasion resistance index of each Example is shown, compared to the corresponding Comparative Example as reference (abrasion resistance index=100%).

TABLE 5

Abrasion resistance index

| | Abrasion resistance index [%] | | |
|---|---|---|---|
| | Low severity | Average | High severity |
| Compound C-A1 | 107 | 108 | 112 |
| Compound C-C1 | 100 | 100 | 100 |
| Compound C-A2 | 114 | 110 | 108 |
| Compound C-C2 | 100 | 100 | 100 |
| Compound C-A3 | 112 | 114 | 111 |
| Compound C-C3 | 100 | 100 | 100 |

The data clearly demonstrates that the rubber compositions comprising the new carbon blacks with narrow ASD show superior wear resistance compared to the standard composition.

What claimed is:

1. A polymer composition comprising a carbon black composition having the properties comprising
   an Aggregate Size Distribution a $\Delta D_{50}/D_{mode}$ of 0.62 to 0.65,
   a Relative Span $(D_{90}-D_{10})/D_{50}$ of 0.7 to 0.8,
   a Quartile Ratio (QR) $D_{75}/D_{25}$ of 1.2 to 1.5,
   a Polydispersity Index of 1.302 to 1.35, and
   an STSA value of 90 to 180 $m^2/g$.

2. The composition of claim 1, obtained by the steps of
   (A) subjecting a hydrocarbon starting material to a high temperature combustion gas stream to achieve thermal decomposition,
   (B) cooling the reaction gases, and
   (C) recovering the carbon black thus obtained,
   wherein the reaction is conducted in a furnace reactor comprising the following elements:
   (i) a combustion chamber;
   (ii) a cylindrical tube for injection of the feedstock;
   (iii) a Venturi shaped reaction tunnel for carbon black formation; and
   (iv) a cylindrical tunnel to terminate carbon black formation by a quench,
   wherein
   (a) the combustion chamber narrows conically over its length $l_1$ from a diameter $d_1$ to a diameter $d_2$,
   (b) the tube shows over its length $l_2$ a constant diameter $d_2$,
   (c) the reaction tunnel expands over its length $l_3$ from diameter $d_2$ to diameter $d_3$, and
   (d) the cylindrical termination tunnel shows over its length $l_4$ a constant diameter $d_3$,
   on condition the ratio $d_2:l_2$ ranges from about 1:2 to about 1:6.

3. A method for improving the properties of the polymer composition of claim 1, comprising the step of adding the carbon black composition.

4. A method for improving wear resistance and reinforcement of the polymer composition of claim 1, comprising the step of adding the carbon black composition.

5. The method of claim 3, wherein the polymer is a synthetic or natural rubber.

6. A method of using the carbon black composition of claim 1 as an additive for the polymer composition, comprising the step of adding the carbon black composition to the polymer composition.

7. A method of using the carbon black composition of claim 1 for improving wear resistance and reinforcement of the polymer composition, comprising the step of adding the carbon black composition to the polymer composition.

8. The method of claim 6, wherein the polymer is a synthetic or natural rubber.

9. A method of using the carbon black composition of claim 1 as a pigment for the polymer composition, comprising the step of adding the carbon black composition as the pigment to the polymer composition.

10. A pneumatic tire comprising a carbon black composition having the properties comprising
    an Aggregate Size Distribution $\Delta D_{50}/D_{mode}$ of 0.62 to 0.65,
    a Relative Span $(D_{90}-D_{10})/D_{50}$ of about 0.7 to about 0.8,
    a Quartile Ratio (QR) $D_{75}/D_{25}$ of 1.2 to 1.5,
    a Polydispersity Index of 1.302 to 1.35, and
    an STSA value of 90 to 180 $m^2/g$.

11. The composition of claim 1, wherein the carbon black composition additionally comprises a tint of from 125.1 to 131.8%.

12. The tire of claim 10, wherein the carbon black composition additionally comprises a tint of from 125.1 to 131.8%.

13. The composition of claim 1, which is a natural or synthetic rubber.

14. The tire of claim 10, which is a natural or synthetic rubber.

15. The composition of claim 1, wherein the carbon black composition shows a STSA value of from 120 to 180 $m^2/g$.

16. The tire of claim 10, wherein the carbon black composition shows a STSA value of from 120 to 180 $m^2/g$.

* * * * *